O. ZWICKER.
Milk-Boilers.
No. 144,819.  Patented Nov. 18, 1873.
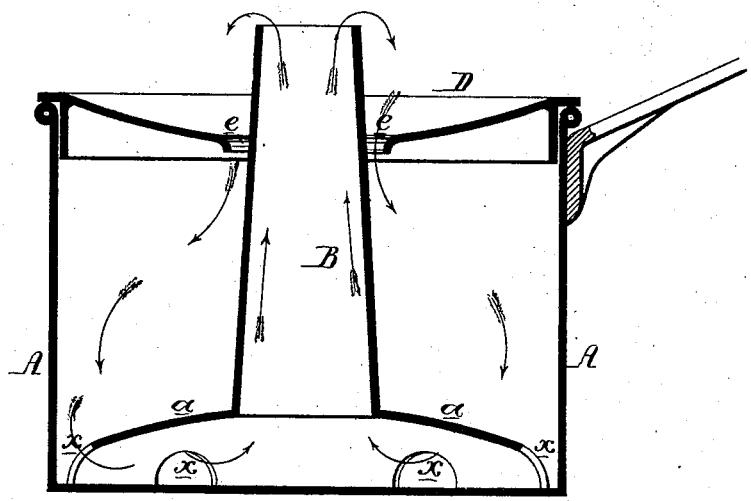
Witnesses: Harry Smith, Hubert Howson
Oswald Zwicker
by his Attys.
Howson and Son

UNITED STATES PATENT OFFICE.

OSWALD ZWICKER, OF PHILADELPHIA, PENNSYLVANIA, ASSIGNOR TO HIMSELF AND HENRY OTTO HERMANN, OF SAME PLACE.

IMPROVEMENT IN MILK-BOILERS.

Specification forming part of Letters Patent No. 144,819, dated November 18, 1873; application filed August 15, 1873.

*To all whom it may concern:*

Be it known that I, OSWALD ZWICKER, of the city and county of Philadelphia and State of Pennsylvania, have invented an Improved Vessel in which to Boil Milk, &c., of which the following is a specification:

The object of my invention is to boil milk and other liquid articles of diet without danger of imparting to the same the unpleasant flavor attributable to a want of a proper circulation of the liquid in the culinary vessel. I attain this object by combining, with an ordinary saucepan or other equivalent vessel, A, a central tube, B, having a perforated or notched base, covering, or nearly covering, the bottom of the pan, as shown in the accompanying drawing, so that there shall be a constant circulation of the liquid upward through the central tube B, and over the bottom of the pan, the liquid escaping from the top of the tube falling onto the dished cover D, and returning to the pan through the annular space e.

The tube B, as well as its hollow base a, may be made of ordinary tinned plate, the base having notches cut in its lower edge, so as to present openings x, which afford a free passage for the liquid from the body of the pan into the hollow base, to there take the place of that which the heat has forced through the central tube B.

The central hole in the dished cover D is of such diameter that the annular opening e shall be of sufficient dimensions for the downward passage into the pan of the liquid which flows over the top of the tube B.

I do not claim the tube B, having a perforated base, and adapted to the vessel A; nor do I claim a sunken cover, D, having an opening, e; but

I claim—

The combination of the central tube B, its enlarged notched or perforated base, the dished cover D, and its opening e, with the pan A, as set forth.

In testimony whereof I have signed my name to this specification in the presence of two subscribing witnesses.

OSWALD ZWICKER.

Witnesses:
HARRY SMITH,
HUBERT HOWSON.